United States Patent
Matsusue

(10) Patent No.: US 9,905,864 B2
(45) Date of Patent: Feb. 27, 2018

(54) FUEL CELL SYSTEM AND CONTROL METHOD THEREOF

(71) Applicant: TOYOTA JIDOSHA KABUSHIKI KAISHA, Toyota-shi, Aichi-ken (JP)

(72) Inventor: Masaaki Matsusue, Mishima (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 245 days.

(21) Appl. No.: 14/694,468

(22) Filed: Apr. 23, 2015

(65) Prior Publication Data

US 2015/0311543 A1    Oct. 29, 2015

(30) Foreign Application Priority Data

Apr. 25, 2014 (JP) ................. 2014-090941

(51) Int. Cl.
*H01M 8/04* (2016.01)
*H01M 8/04007* (2016.01)
*H01M 8/04828* (2016.01)
*H01M 8/0432* (2016.01)
*H01M 8/04701* (2016.01)
*H01M 8/04746* (2016.01)
*H01M 8/04029* (2016.01)
(Continued)

(52) U.S. Cl.
CPC ..... *H01M 8/04074* (2013.01); *H01M 8/0494* (2013.01); *H01M 8/04358* (2013.01);
(Continued)

(58) Field of Classification Search
None
See application file for complete search history.

(56) References Cited

U.S. PATENT DOCUMENTS

2010/0112401 A1  5/2010  Noto et al.
2010/0266916 A1  10/2010  Imanishi et al.
(Continued)

FOREIGN PATENT DOCUMENTS

CN  101622748 A  1/2010
JP  2002313405 A  10/2002
(Continued)

OTHER PUBLICATIONS

Notice of Allowance dated Aug. 12, 2016 in U.S. Appl. No. 14/385,303.
Office Action dated Apr. 19, 2016 in U.S. Appl. No. 14/385,303.

*Primary Examiner* — Barbara L Gilliam
*Assistant Examiner* — Adam A Arciero
(74) *Attorney, Agent, or Firm* — Andrews Kurth Kenyon LLP

(57) ABSTRACT

A fuel cell system includes a fuel cell, a fuel gas supply/exhaust portion, an oxidant gas supply/exhaust portion, a cooling portion, and a controller. The controller performs at least one of a transient increase control process and a transient decrease control process. In the transient increase control process, the controller determines whether a temperature of a coolant is in a transient increase state. In the transient increase state, the controller performs an oxidant gas pressure increase process. In the transient decrease control process, the controller determines whether the temperature of the coolant is in a transient decrease state. In the transient decrease state, the controller performs at least one of the oxidant gas pressure increase process and an output increase process. In the output increase process, the controller controls the fuel cell to generate an output higher than a target output corresponding to a request output.

6 Claims, 7 Drawing Sheets

(51) Int. Cl.
*H01M 8/04119* (2016.01)
*H01M 8/1018* (2016.01)
*H01M 8/04089* (2016.01)

(52) U.S. Cl.
CPC ... *H01M 8/04723* (2013.01); *H01M 8/04753* (2013.01); *H01M 8/04029* (2013.01); *H01M 8/04089* (2013.01); *H01M 8/04126* (2013.01); *H01M 2008/1095* (2013.01)

(56) References Cited

U.S. PATENT DOCUMENTS

| | | | |
|---|---|---|---|
| 2011/0217611 A1* | 9/2011 | Okuyoshi | H01M 8/045 429/429 |
| 2012/0225330 A1 | 9/2012 | Umayahara et al. | |
| 2013/0330646 A1 | 12/2013 | Aoki | |
| 2015/0180070 A1 | 6/2015 | Matsusue et al. | |
| 2015/0270565 A1* | 9/2015 | Song | B60L 11/1892 701/22 |
| 2015/0311543 A1 | 10/2015 | Matsusue et al. | |

FOREIGN PATENT DOCUMENTS

| | | |
|---|---|---|
| JP | 2005251434 A | 9/2005 |
| JP | 2008192468 A | 8/2008 |
| JP | 2010067434 A | 3/2010 |
| JP | 2012-004138 A | 1/2012 |
| JP | 2012-109182 A | 6/2012 |
| JP | 2012169197 A | 9/2012 |
| JP | 5061594 B2 | 10/2012 |
| WO | 2008108451 A1 | 9/2008 |
| WO | 2012/117937 A1 | 9/2012 |

* cited by examiner (A)

(B)

FUEL CELL SYSTEM AND CONTROL METHOD THEREOF

INCORPORATION BY REFERENCE

The disclosure of Japanese Patent Application No. 2014-090941 filed on Apr. 25, 2014 including the specification, drawings and abstract is incorporated herein by reference in its entirety.

BACKGROUND OF THE INVENTION

1. Field of the Invention

The present invention relates to a fuel cell system and a control method thereof.

2. Description of Related Art

Japanese Patent Application Publication No. 2012-004138 (JP 2012-004138 A) describes a fuel cell system configured such that: when it is determined that a fuel cell is in a transient operation state, the fuel cell system performs a control to increase a pressure target value of an oxidant gas to be larger than a pressure target value for a normal operation, so as to prevent abnormal decrease of an output voltage of the fuel cell when abnormality occurs in an air supply system. Published Japanese Patent Application Publication No. 2012-109182 (JP-A-2012-109182) describes a fuel cell system configured such that: in a case of a transient decrease in which a load decreases, when a detected dry/wet state of a fuel cell is an excessively dry state or an excessively wet state, a flow rate of a cathode gas or a decrease rate of a pressure is controlled according to the state thus detected so as to moderate the state, thereby controlling an amount of water to be carried away by the cathode gas, such that the dry/wet state of the fuel cell is controlled sufficiently. International Publication No. 2012/117937 describes a fuel cell system configured such that: at the time of a transient operation in which an operation state changes, a wet state of an electrolyte membrane is controlled so as to gradually change from a wet state, which is detected before the transient operation starts, to a steady time target wet state based on a set transient time target wet state, thereby preventing a transitional large change of a flow rate or the like of a reaction gas from deteriorating fuel economy and sound vibration performance.

However, in JP 2012-004138 A, depending on an operation state after the transient operation, the wet state of the cell may be further deteriorated. For example, in a case where a request output decreases in a state of a further wet side relative to an appropriate wet state of the fuel cell, there is such a possibility that the wet state of the cell becomes an excessively wet state. Further, when a request output increases in a state on a dry side, there is such a possibility that the wet state of the cell becomes an excessively dry state. Accordingly, there is such a possibility that an available output of the fuel cell is limited depending on an operation state after the transient operation, and the fuel cell cannot output the request output. Further, as described above, in JP-A-2012-109182, the amount of water to be carried away by the cathode gas can be controlled according to a detected state, such that the dry/wet state of the fuel cell can be controlled. Moreover, as described above, in International Publication No. 2012/117937, at the time of the transient operation in which the operation state changes, the wet state of the electrolyte membrane is controlled to gradually change from the wet state detected before the transient operation starts to the steady time target wet state, based on the set transient time target wet state. With such a configuration, similarly to the case of JP-A-2012-109182, the dry/wet state of the fuel cell can be controlled. However, the control of the dry/wet state of the fuel cell by the techniques of JP-A-2012-109182 and International Publication No. 2012/117937 is complicated, so it has been desired to realize the control by a simple and easy technique.

SUMMARY OF THE INVENTION

The present invention provides a fuel cell system and a control method thereof.

A fuel cell system according to a first aspect of the invention includes a fuel cell, a fuel gas supply/exhaust portion, an oxidant gas supply/exhaust portion, a cooling portion, and a controller. The fuel cell is configured to generate a power by an electrochemical reaction between a fuel gas and an oxidant gas. The fuel gas supply/exhaust portion is configured to supply the fuel gas to the fuel cell and to exhaust the fuel gas from the fuel cell. The oxidant gas supply/exhaust portion is configured to supply the oxidant gas to the fuel cell and to exhaust the oxidant gas from the fuel cell. The cooling portion is configured to circulate a coolant through the fuel cell. The controller is configured to control the cooling portion to adjust a temperature of the coolant. The controller is configured to perform at least one of a transient increase control process and a transient decrease control process. The controller is configured to determine, in the transient increase control process, whether the temperature of the coolant is in a transient increase state in which a state of the temperature of the coolant is changed to a high-temperature state that deviates from a steady control state in which the temperature of the coolant is controlled to a steady temperature. The controller is configured to perform, when the controller determines that the temperature of the coolant is in the transient increase state, an oxidant gas pressure increase process. The controller is configured to control, in the oxidant gas pressure increase process, the oxidant gas supply/exhaust portion in a first period such that a target value of a pressure of the oxidant gas to be supplied to the fuel cell becomes higher than an operation target value corresponding to an operating state of the fuel cell system in the steady control state, the first period being a period during which the temperature of the coolant increases. The controller is configured to determine, in the transient decrease control process, whether the temperature of the coolant is in a transient decrease state in which the state of the temperature of the coolant is changed to the steady control state from the high-temperature state deviating from the steady control state. The controller is configured to perform, when the controller determines that the temperature of the coolant is in the transient decrease state, at least one of the oxidant gas pressure increase process and an output increase process in a second period, the second period being a period during which the state of the temperature of the coolant returns to a steady temperature state from the high-temperature state, the steady temperature state being a state of the temperature of the coolant in which the coolant is in the steady temperature. The controller is configured to control, in the output increase process, the fuel cell to generate an output higher than a target output corresponding to a request output.

According to the fuel cell system of the first aspect of the present invention, by increasing the pressure of the oxidant gas in the first period in the transient increase state of the temperature of the coolant, it is possible to reduce a volume flow of the oxidant gas flowing through the fuel cell, thereby reducing an amount of water to be carried away from inside of the fuel cell. Hereby, it is possible to reduce such a possibility that a wet state of the fuel cell is not in an appropriate state (that is, the fuel cell enters a dry state) in the transient increase state. Further, by increasing the pressure of the oxidant gas in the second period in the transient decrease state of the temperature of the coolant, it is possible to reduce the amount of water to be carried away from inside of the fuel cell, thereby making it possible to reduce such a possibility that the wet state of the fuel cell is not in an appropriate state (that is, the fuel cell enters a dry state) in the transient decrease state. Further, in the second period in the transient decrease state of the temperature of the coolant, when the target value of the output of the fuel cell is set to a value higher than the target value corresponding to the request output, water generated by power generation can be increased, thereby making it possible to reduce a possibility that the fuel cell enters the dry state. Consequently, in the fuel cell system according to the first aspect of the invention, it is possible to reduce a possibility that the wet state of the fuel cell is not in an appropriate state (that is, the fuel cell enters a dry state) in the transient increase state or in the transient decrease state, and to reduce a possibility that an available output of the fuel cell is limited in a subsequent operation and the fuel cell cannot perform an output according to the output request.

In the first aspect of the invention, the controller may be configured to perform both the transient increase control process and the transient decrease control process.

According to the fuel cell system, it is possible to reduce a possibility that the wet state of the fuel cell is not in an appropriate state (that is, the fuel cell enters a dry state) in the transient increase state and in the transient decrease state, and to reduce a possibility that an available output of the fuel cell is limited in a subsequent operation and the fuel cell cannot perform an output according to a request.

In the first aspect of the invention, the controller may be configured to perform both the oxidant gas pressure increase process and the output increase process in the transient decrease control process.

According to the fuel cell system, in the transient decrease state, the oxidation gas pressure is increased to reduce the amount of water to be carried away, and to further increase a dry restraining effect by increasing the output target value to generate water.

In the first aspect of the invention, the controller may be configured to determine the transient increase state of the temperature of the coolant based on either one of a first condition and a second condition. The first condition is that the temperature of the coolant increases over an increase threshold temperature. The second condition is that an output request to the fuel cell is an increase threshold output or more. In addition, the controller may be configured to determine the transient decrease state of the temperature of the coolant based on either one of a third condition and a fourth condition. The third condition is that the temperature of the coolant decreases over a decrease threshold temperature. The fourth condition is that the output request to the fuel cell is a decrease threshold output or less.

According to the fuel cell system, it is possible to easily determine the transient increase of the coolant and it is possible to easily determine the transient decrease of the coolant.

In the first aspect of the invention, the first period may be a period from a time point when the controller determines that the temperature of the coolant is in the transient increase state, until a time point when the temperature of the coolant increases to an increase end threshold temperature. The second period may be a period from a time point when it is determined that the temperature of the coolant is in the transient decrease state, until a time point when the temperature of the coolant decreases to a decrease end threshold temperature.

According to the fuel cell system, it is possible to easily find the first period and the second period.

A second aspect of the invention is a control method of a fuel cell system. The control method is a method for controlling supply of a fuel gas, an oxidant gas, and a coolant to a fuel cell to generate a power. The control method includes performing at least one of a transient increase control process and a transient decrease control process. In the transient increase control process, it is determined whether a temperature of the coolant is in a transient increase state in which a state of the temperature of the coolant is changed to a high-temperature state deviating from a steady control state in which the temperature of the coolant is controlled to a steady temperature. When it is determined that the temperature of the coolant is in the transient increase state, an oxidant gas pressure increase process is performed in a first period during which the temperature of the coolant increases. The oxidant gas pressure increase process is a process of setting a target value of a pressure of the oxidant gas to be supplied to the fuel cell to a value that is higher than an operation target value corresponding to an operating state of the fuel cell system in the steady control state. In the transient decrease control process, it is determined whether the temperature of the coolant is in a transient decrease state in which the state of the temperature of coolant is changed to the steady control state from the high-temperature state deviating from the steady control state. When it is determined that the temperature of the coolant is in the transient decrease state, at least one of the oxidant gas pressure increasing process and an output increase process is performed in a second period. The second period is a period during which the state of the temperature of the coolant returns to a steady temperature state from the high-temperature state. The steady temperature state is a state of the temperature of the coolant in which the coolant is in the steady temperature. In the output increase process, a target value of an output of the fuel cell is set to a value higher than a target value corresponding to a request output.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A. First Embodiment

Figure 1:
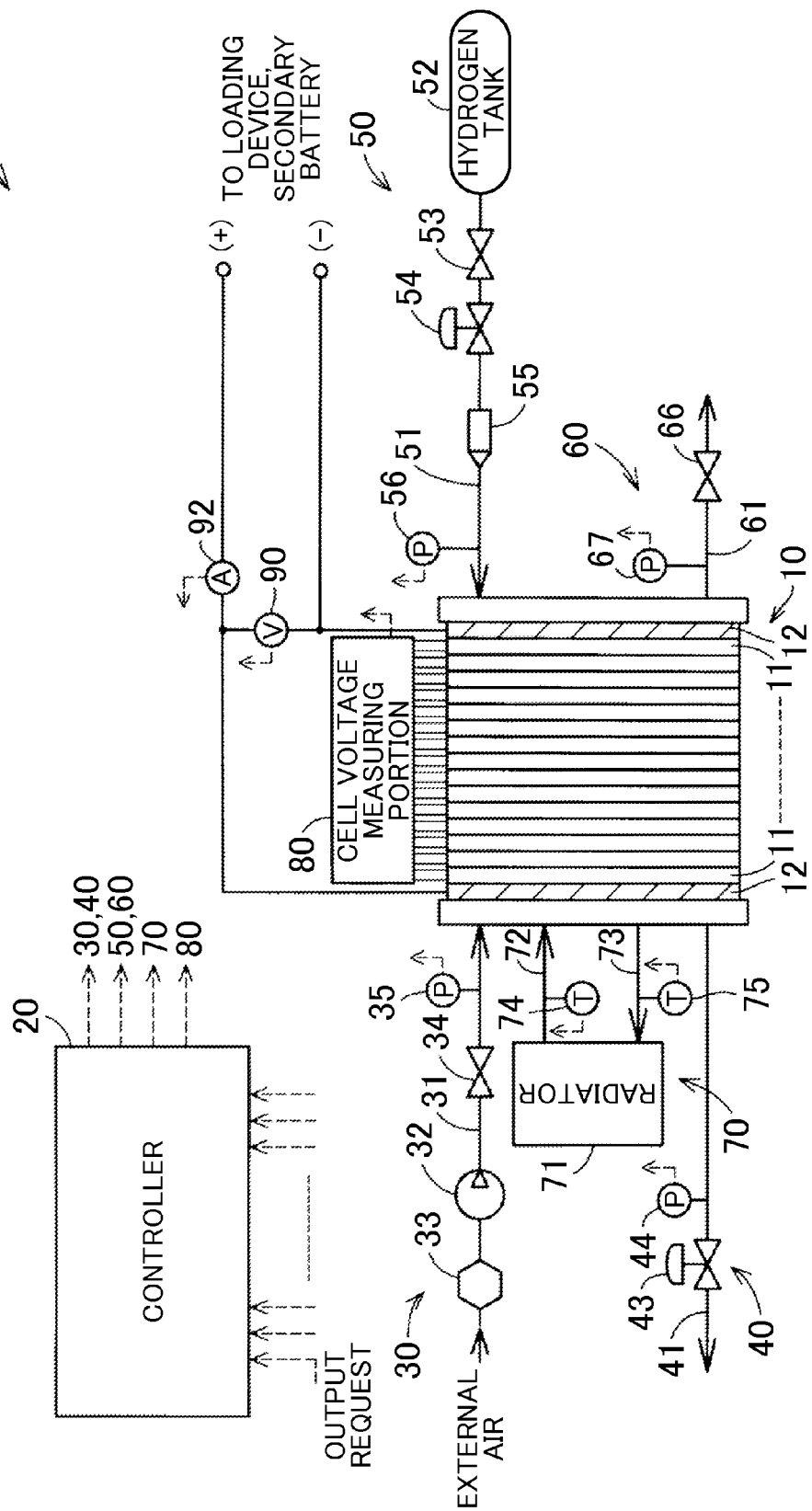
FIG. 1 is an explanatory view schematically illustrating an exemplary configuration of a fuel cell system according to a first embodiment of the present invention.

FIG. 1 is an explanatory view schematically illustrating an exemplary configuration of a fuel cell system according to the first embodiment. As the fuel cell system 100, a fuel cell system provided in a fuel cell vehicle and configured to output a power to be used as a driving force in response to a request from a driver is exemplified.

The fuel cell system 100 includes a fuel cell 10, a controller 20, a cathode gas supply system 30, a cathode gas exhaust system 40, an anode gas supply system 50, an anode gas exhaust system 60, a cooling system 70, a cell voltage measuring portion 80, an output voltage measuring portion 90, and an output current measuring portion 92. The cathode gas supply system 30 and the cathode gas exhaust system 40 may be considered as an oxidant gas supply/exhaust portion of the present invention. The anode gas supply system 50 and the anode gas exhaust system 60 may be considered as a fuel gas supply/exhaust portion of the present invention. The cooling system 70 may be considered as a cooling portion of the present invention.

The fuel cell 10 generates a power by an electrochemical reaction between a fuel gas (hydrogen) as an anode gas to be supplied to an anode and an oxidant gas (the air, more strictly, oxygen included in the air) as a cathode gas to be supplied to a cathode. The fuel cell 10 has a stack structure in which a plurality of single cells 11 is laminated. Terminal plates 12 are provided on both ends of the stack of the plurality of cells 11.

The cell 11 basically has a configuration in which a membrane electrode assembly (MEA) is sandwiched between separators, although not illustrated herein. The MEA is constituted by a solid polymer electrolyte membrane (hereinafter just referred to as the "electrolyte membrane") made of an ion exchange membrane, a catalyst electrode (referred to as the "anode side catalyst electrode" or just referred to as the "anode") formed on an anode-side surface of the electrolyte membrane, and a catalyst electrode (referred to as the "cathode side catalyst electrode" or just referred to as the "cathode") formed on a cathode-side surface of the electrolyte membrane. A gas diffusion layer (GDL) is provided between the MEA and each of the separators on an anode side and on a cathode side. Further, a groove-shaped gas passage through which a gas such as the anode gas or the cathode gas is formed on a surface between the separator and the gas diffusion layer. However, a gas passage portion may be separately provided between the separator and the gas diffusion layer. Note that, respective constituents formed between the electrolyte membrane and the separator on the anode side may be collectively referred to as the "anode." Further, respective constituents formed between the electrolyte membrane and the separator on the cathode side may be collectively referred to as the "cathode."

The controller 20 can be constituted by a microcomputer including a central processing unit and a main storage. The controller 20 controls various devices included in the after-mentioned systems 30 to 70, based on information indicated by a signal sent from each of the after-mentioned measuring portions and switches of the fuel cell 10, so as to cause the fuel cell 10 to generate a power according to an output request. Examples of the various devices include an opening/closing valve, a pressure regulating valve, a regulator, a compressor, a radiator, and the like.

The cathode gas supply system 30 includes a cathode gas pipe 31, an air compressor 32, an air flow meter 33, an opening/closing valve 34, and a pressure measuring portion 35. The cathode gas pipe 31 is a pipe connected to a cathode-side inlet of the fuel cell 10.

The air compressor 32 is connected to the fuel cell 10 via the cathode gas pipe 31, and configured to take an external air therein and compress the air, and to supply the air thus compressed to the fuel cell 10 as a cathode gas. The air flow meter 33 measures, in an upstream of the air compressor 32, an amount of the external air taken into the air compressor 32, and transmits a measured value to the controller 20. Further, the pressure measuring portion 35 is constituted by use of a pressure sensor, for example. The pressure measuring portion 35 measures a pressure of the air supplied to the fuel cell 10, and transmits a measured value to the controller 20. The controller 20 drives the air compressor 32 and a pressure regulating valve 43 of the after-mentioned cathode gas exhaust system 40 based on the measured values, so as to control an air supply amount and a pressure to the fuel cell 10. The opening/closing valve 34 is provided between the air compressor 32 and the fuel cell 10. The opening/closing valve 34 is generally in a closed state, and when the air having a predetermined pressure is supplied from the air compressor 32 to the cathode gas pipe 31, the opening/closing valve 34 is opened.

The cathode gas exhaust system 40 includes a cathode exhaust gas pipe 41, the pressure regulating valve 43, and a pressure measuring portion 44. The cathode exhaust gas pipe 41 is a pipe connected to a cathode-side outlet of the fuel cell 10. A cathode exhaust gas (an exhaust gas of an oxidant gas discharged from the fuel cell; also referred to as the "oxidant exhaust gas") is discharged to an outside the fuel cell system 100 through the cathode exhaust gas pipe 41.

An opening degree of the pressure regulating valve 43 is controlled by the controller 20, so as to adjust a pressure (a cathode-side back pressure of the fuel cell 10) of the cathode exhaust gas in the cathode exhaust gas pipe 41. The pressure measuring portion 44 is constituted by use of a pressure sensor, for example, and provided in an upstream of the pressure regulating valve (also referred to as the "back-pressure regulating valve") 43. The pressure measuring portion 44 measures a pressure (also referred to as the "cathode back pressure") of the cathode exhaust gas, and transmits a measured value to the controller 20. As described above, the controller 20 controls the pressure of the air (the cathode gas, the oxidant gas) to be supplied to the fuel cell 10 based on the measured values of the pressure measuring portion 35 of the cathode gas supply system 30 and the pressure measuring portion 44 of the cathode gas exhaust system 40.

The anode gas supply system 50 includes an anode gas pipe 51, a hydrogen tank 52, an opening/closing valve 53, a regulator 54, a hydrogen supply device 55, and a pressure measuring portion 56. The hydrogen tank 52 is connected to the anode of the fuel cell 10 via the anode gas pipe 51, and supplies hydrogen filled in the tank to the fuel cell 10.

The opening/closing valve 53, the regulator 54, the hydrogen supply device 55, and the pressure measuring portion 56 are provided in the anode gas pipe 51 in this order from the upstream (a hydrogen-tank-52 side). The opening/closing valve 53 is opened and closed in response to an instruction from the driving controller 21, so as to control inflow of hydrogen from the hydrogen tank 52 to the upstream of the hydrogen supply device 55. The regulator 54 is a pressure reducing valve to adjust a pressure of the hydrogen in the upstream of the hydrogen supply device 55, and an opening degree of the regulator 54 is controlled by the controller 20.

The hydrogen supply device 55 can be constituted by an injector that is an electromagnetically driven opening/closing valve. The pressure measuring portion 56 is constituted by use of a pressure sensor, for example. The pressure measuring portion 56 measures a pressure of hydrogen in a downstream of the hydrogen supply device 55, and transmits a measured value to the controller 20. The controller 20 controls an amount of hydrogen to be supplied to the fuel cell 10 by controlling the hydrogen supply device 55 based on the measured value of the pressure measuring portion 56.

The anode gas exhaust system 60 includes an anode exhaust gas pipe 61, an opening/closing valve 66, and a pressure measuring portion 67. The anode exhaust gas pipe 61 is a pipe connected to an anode-side outlet of the fuel cell 10. An anode exhaust gas including an unreacted gas (hydrogen, nitrogen, or the like) that has not been used in a power generation reaction is discharged to the outside the fuel cell system 100 through the anode exhaust gas pipe 61.

The opening/closing valve 66 is provided in the anode exhaust gas pipe 61, and is opened and closed in response to an instruction from the driving controller 21. The pressure measuring portion 67 of the anode gas exhaust system 60 is provided in the anode exhaust gas pipe 61. The pressure measuring portion 67 is constituted by use of a pressure sensor, for example. The pressure measuring portion 67 measures a pressure of the anode exhaust gas (an anode-side back pressure of the fuel cell 10) in vicinity to an outlet of a hydrogen manifold of the fuel cell 10 and transmits a measured value to the controller 20.

The cooling system 70 includes a radiator 71, a refrigerant supply pipe 72 configured to supply a coolant to the fuel cell 10, a refrigerant discharge pipe 73 configured to recover the coolant thus discharged from the fuel cell 10 to the radiator 71, a temperature measuring portion 74 configured to measure a temperature of the coolant in the refrigerant supply pipe 72, and a temperature measuring portion 75 configured to measure a temperature of the coolant in the refrigerant discharge pipe 73. The radiator 71 supplies the coolant to the fuel cell 10 via the refrigerant supply pipe 72, and receipt of the coolant discharged from the fuel cell 10 via the refrigerant discharge pipe 73, thereby circulating the coolant to cool off the fuel cell 10. As the coolant, water, antifreeze solution, or the like can be used. Note that the temperature of the coolant in the refrigerant supply pipe 72 is measured by the temperature measuring portion 74, and the temperature of the coolant in the refrigerant discharge pipe 73 is measured by the temperature measuring portion 75. Measured values thereof are transmitted to the controller 20. Note that the temperature measuring portions 74, 75 are constituted by use of a temperature sensor, for example. The controller 20 controls an operation of the radiator 71 based on the measured values thus received, so as to adjust a flow rate of the coolant. Hereby, the controller 20 controls a temperature of the coolant discharged from the fuel cell 10 to be maintained at a temperature set in advice (hereinafter referred to as the "steady temperature"), such that the fuel cell 10 operates at a temperature of not more than the steady temperature.

The cell voltage measuring portion 80 is connected to each cell 11 of the fuel cell 10, and can measure a cell voltage caused between an anode and a cathode of the each cell 11. The cell voltage measuring portion 80 transmits a measured value to the controller 20. The output voltage measuring portion 90 measures an output voltage caused between a positive terminal (+) connected to a positive-side terminal plate 12 of the fuel cell 10 and a negative terminal (−) connected to a negative-side terminal plate 12, and transmits a measured value to the controller 20. The output current measuring portion 92 measures an output current flowing through the positive terminal (+), and transmits a measured value to the controller 20.

Although not illustrated or described herein, various loading devices such as an auxiliary circuit and a driving circuit, and a secondary battery are connected to an output terminal of the fuel cell 10.

As described above, the fuel cell system 100 basically operates to generate a power necessary to drive the loading device by controlling each of the systems 30 to 70 by the controller 20, and to charge the secondary battery with a surplus power. Note that the control of each of the systems 30 to 70 by the controller 20 may be performed by another controller provided separately from the controller 20 so as to actually control an operation of each of the system 30 to 70, in response to an instruction from the controller 20 or in cooperation with the controller 20. Hereinafter, this basic generation operation is referred to as the "basic operation" or "normal operation." The present embodiment has such a feature that the operation target value of the pressure of the cathode gas (oxidant gas) is changed according to a state of the temperature of the coolant. More specifically, the operation target value is increased during a coolant-temperature transient increase period, as will be described below. The operation target value is set in association with an output request in the basic operation.

Figure 2:
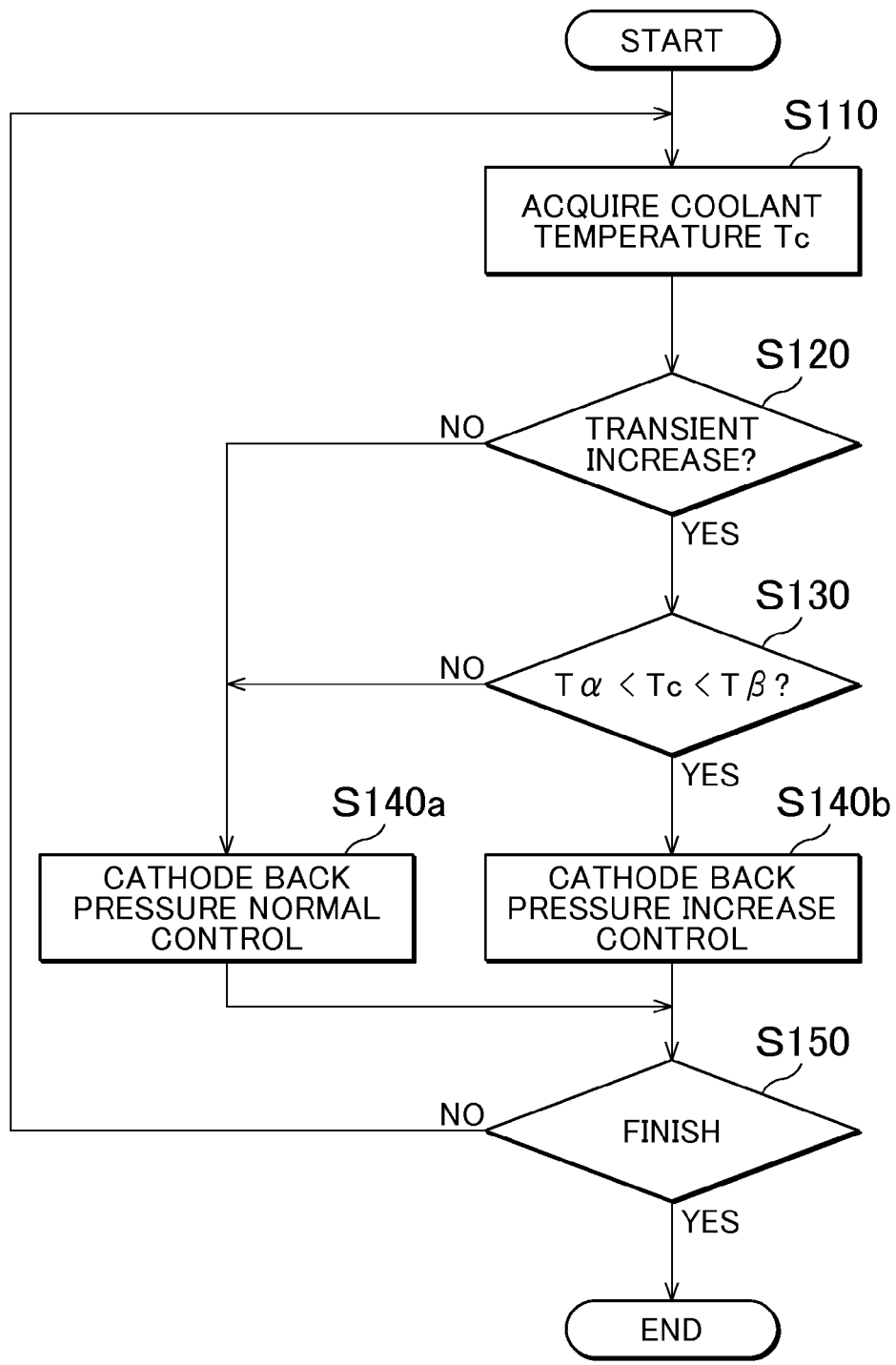
FIG. 2 is an explanatory view illustrating a procedure of a pressure control of a cathode gas according to a state of a temperature of a coolant, which pressure control is performed in the first embodiment of the present invention.
Figure 3:
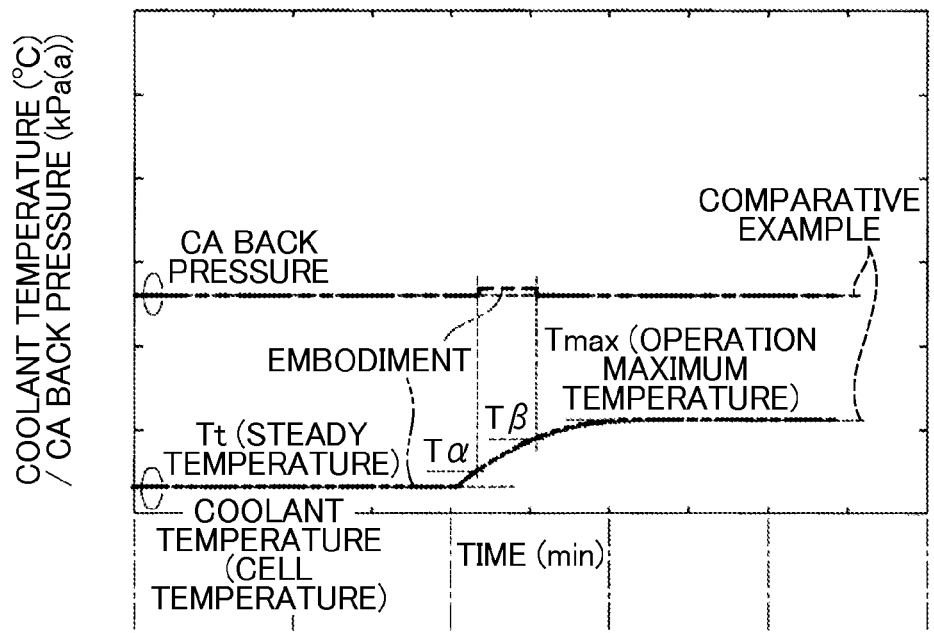
FIG. 3 is an explanatory view illustrating an example of the pressure control of the cathode gas to be performed according to the state of the temperature of the coolant as illustrated in FIG. 2.
Figure 3:
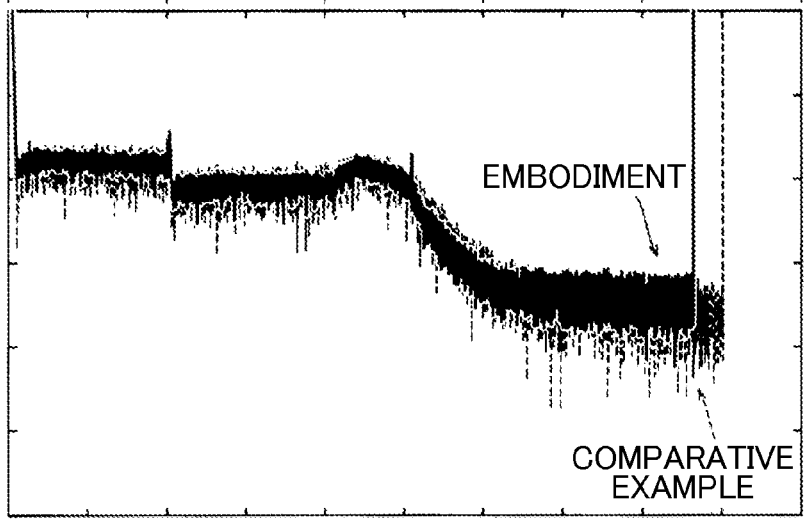

FIG. 2 is an explanatory view illustrating a procedure of a pressure control of the cathode gas according to a state of the temperature of the coolant, which pressure control is performed in the first embodiment. FIG. 3 is an explanatory view illustrating an example of the pressure control of the cathode gas to be performed according to the state of the temperature of the coolant as illustrated in FIG. 2. Note that this control operation is performed by the controller 20 (see FIG. 1) at the same time as the control of the basic operation.

First, in step S110, a temperature Tc of the coolant is acquired. As the temperature Tc of the coolant, the temperature measured by the temperature measuring portion 75 in the refrigerant discharge pipe 73 is used. Since the coolant flowing through the refrigerant discharge pipe 73 has cooled down respective cells 11 of the fuel cell 10, the acquired temperature Tc of the coolant can be treated as an average cell temperature of the respective cells 11 of the fuel cell 10.

Here, as described above, a flow rate or the like of the coolant of the radiator 71 of the cooling system 70 is controlled such that the temperature of the coolant discharged from the fuel cell 10 reaches a steady temperature Tt [° C.] (see (A) shown in FIG. 3), thereby controlling a cell temperature of the fuel cell 10 to be at the steady temperature Tt. Note that a state where the temperature of the coolant is controlled to the steady temperature Tt [° C.] is hereinafter referred to as the "steady control state." When an output request to the fuel cell 10 is increased and an increase in the temperature due to heat generation of the cells 11 of the fuel cell 10 cannot be absorbed by the cooling with the coolant, the temperature Tc of the coolant deviates from the steady control state and increases, and finally, the cooling with the coolant at a maximum flow is balanced with the heat generation of the cells 11 of the fuel cell 10 at an operation maximum temperature Tmax [° C.].

In step S120 of FIG. 2, it is determined whether the temperature of the coolant is in a transient increase state. More specifically, when the temperature increases over an increase threshold temperature Tα [° C.] set in advance (see (A) shown in FIG. 3), it is determined that the temperature is in the transient increase state. The increase threshold temperature Tα is a temperature that satisfies Tα>Tt, and is a temperature determined experimentally as a temperature based on which it can be determined that a controlled state of the temperature of the coolant deviates from the steady control state to enter the transient increase state.

When the temperature is not in the transient increase state, the control of the cathode back pressure is set to a normal control state in step S140a. More specifically, the control of the pressure regulating valve 43 is performed (see (A) shown in FIG. 3) so as to reach a value (hereinafter also referred to as the "normal cathode back pressure value") of a cathode back pressure (CA back pressure) corresponding to that operation target value (hereinafter also referred to as the "normal cathode pressure target value") of the pressure of the cathode gas which is set in the normal operation.

In a case of the transient increase state, it is determined whether the acquired temperature Tc of the coolant has increased to an increase end threshold temperature Tβ [° C.] set in advance, in step S130. The increase end threshold temperature Tβ is a temperature that satisfies Tα<Tβ<Tmax, and a temperature determined experimentally as a temperature that achieves the after-mentioned effects.

In a case where the temperature Tc of the coolant has not increased to the increase end threshold temperature Tβ, that is, in a case of Tα<Tc<Tβ, the control of the cathode back pressure is set to an increase control state in step S140b. More specifically, the control of the pressure regulating valve 43 is performed (see 3(A) shown in FIG. 3) such that a pressure value of the cathode gas reaches that value of the cathode back pressure which is higher than the normal cathode back pressure value corresponding to a value higher than the normal cathode pressure target value. In contrast, in a case where the temperature Tc of the coolant has increased to the increase end threshold temperature Tβ or more, that is, in a case of Tc≥Tβ, the control of the cathode back pressure is set to the normal control state in step S140a. Note that the pressure value of the cathode gas which is higher than the normal cathode pressure target value, and the value of the cathode back pressure which is higher than the normal cathode back pressure value corresponding to the pressure value are determined experimentally as values that achieve the after-mentioned effect.

Then, until it is determined that the operation of the fuel cell system is finished in step S150, the process from step S110 to step S140a or step S110 to step S140b is performed repeatedly.

When the above process is performed, the value of the cathode back pressure is set to a cathode back pressure value which is higher than the normal cathode back pressure value, and the pressure of the cathode gas is set to a value higher than the normal cathode pressure target value, in a period (a first period) after it is determined that the temperature Tc of the coolant exceeds the increase threshold temperature Tα to enter the transient increase state but before the temperature reaches the increase end threshold temperature Tβ. Note that a comparative example illustrated in (A) of FIG. 3 indicates a case where the value of the cathode back pressure is set to the normal cathode back pressure value in a normal operation even in the period after it is determined that the temperature Tc of the coolant is in the transient increase state but before the temperature reaches the increase end threshold temperature Tβ.

In a case where the pressure of the cathode gas is increased by setting the cathode back pressure to the value higher than the normal cathode back pressure value, in-plane circulation of water generated in the cathode of each cell 11 of the fuel cell 10 is promoted, such that drying of the each cell 11 can be delayed. Further, a volume flow of the cathode gas passing through each cell 11 of the fuel cell 10 is reduced, thereby restraining water present in the cathode of each cell 11 from being carried away by the cathode gas, such that drying of the each cell 11 can be restrained. As a result, a cell voltage in a high temperature state (a state of the operation maximum temperature Tmax in the example of FIG. 3) after the transient increase state can be improved by an easy and simple technique so as to exhibit a high voltage characteristic as compared with the comparative example. Accordingly, it is possible to reduce a possibility that an available output of the fuel cell is limited depending on an operation state after the transient operation and the fuel cell cannot perform an output according to an output request. Note that the cell voltage illustrated in (B) of FIG. 3 is measured by the cell voltage measuring portion 80 or by dividing a measured value of the output voltage measuring portion 90 by the number of cells.

Note that the increase threshold temperature Tα, the increase end threshold temperature Tβ, that pressure value of the cathode gas which is higher than the normal cathode pressure target value, that value of the cathode back pressure which is higher than the normal cathode back pressure value, an increase threshold output, and the like are set to obtain the effect of delaying drying of each cell 11 by promoting in-plane circulation of water generated in the cathode of the each cell 11 of the fuel cell 10, and the effect of restraining drying of each cell 11 by restraining water present in the cathode of the each cell 11 from being carried away by the cathode gas, as described above.

As is apparent from the above description, the pressure control process of the cathode gas according to the state of the temperature of the coolant, which pressure control process is performed in the present embodiment, may be considered as a transient increase control process of performing an oxidant gas pressure increase process in the present invention.

B. Second Embodiment

The second embodiment has a feature that the target value of an output of a fuel cell which is set in association with an output request in a basic operation is changed according to a state of a temperature of a coolant, more specifically, the target value is increased in a transient decrease period of the temperature of the coolant, as will be described below. Note that a configuration of a fuel cell system according to the present embodiment is the same as the fuel cell system 100 (see FIG. 1) of the first embodiment except an operation of a controller to perform the above feature, so the fuel cell system in the present embodiment is the same fuel cell system 100 as in the first embodiment.

Figure 4:
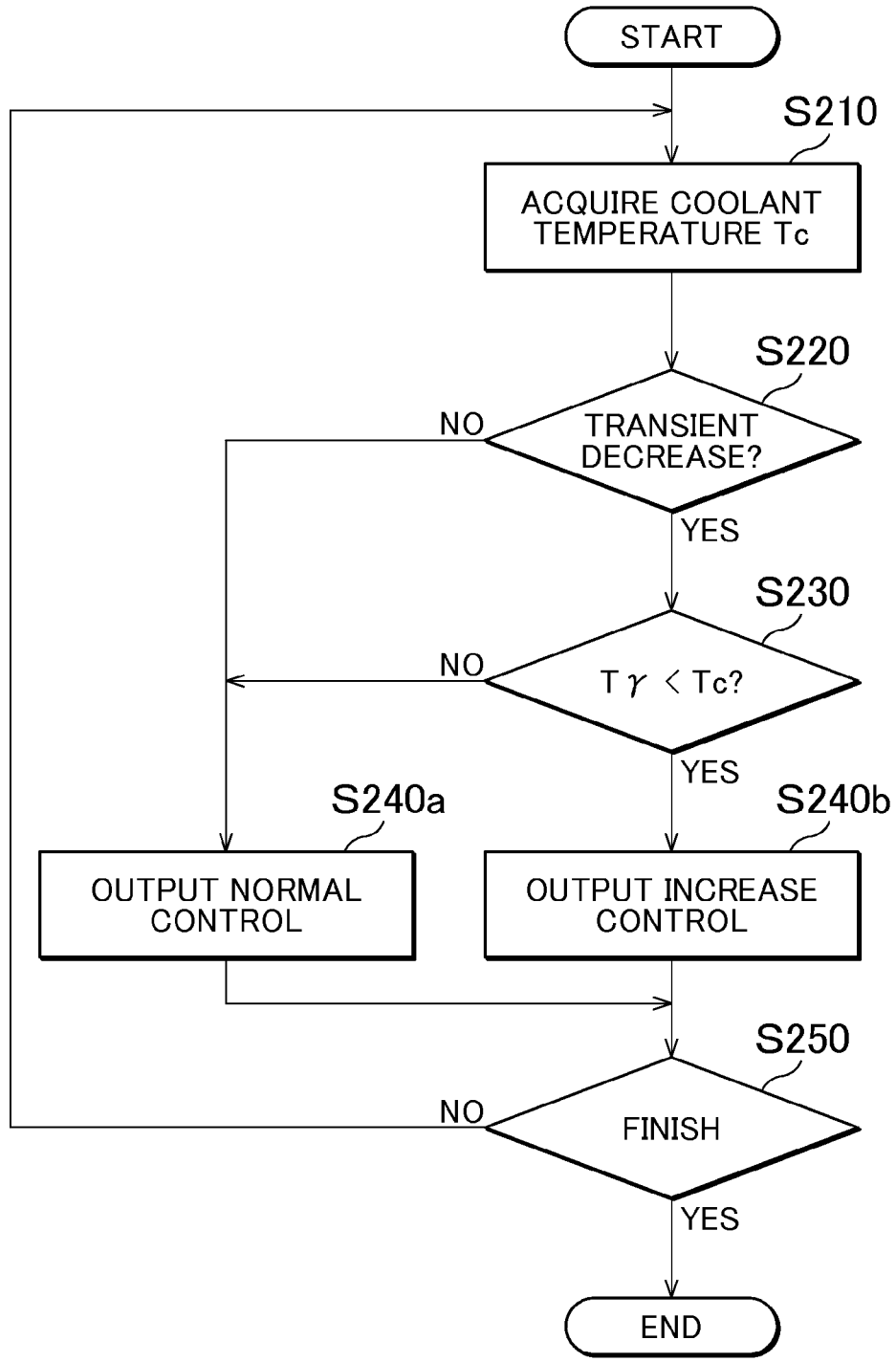
FIG. 4 is an explanatory view illustrating a procedure of an output control of a fuel cell according to a state of a temperature of a coolant, which output control is performed in a second embodiment of the present invention.
Figure 5:
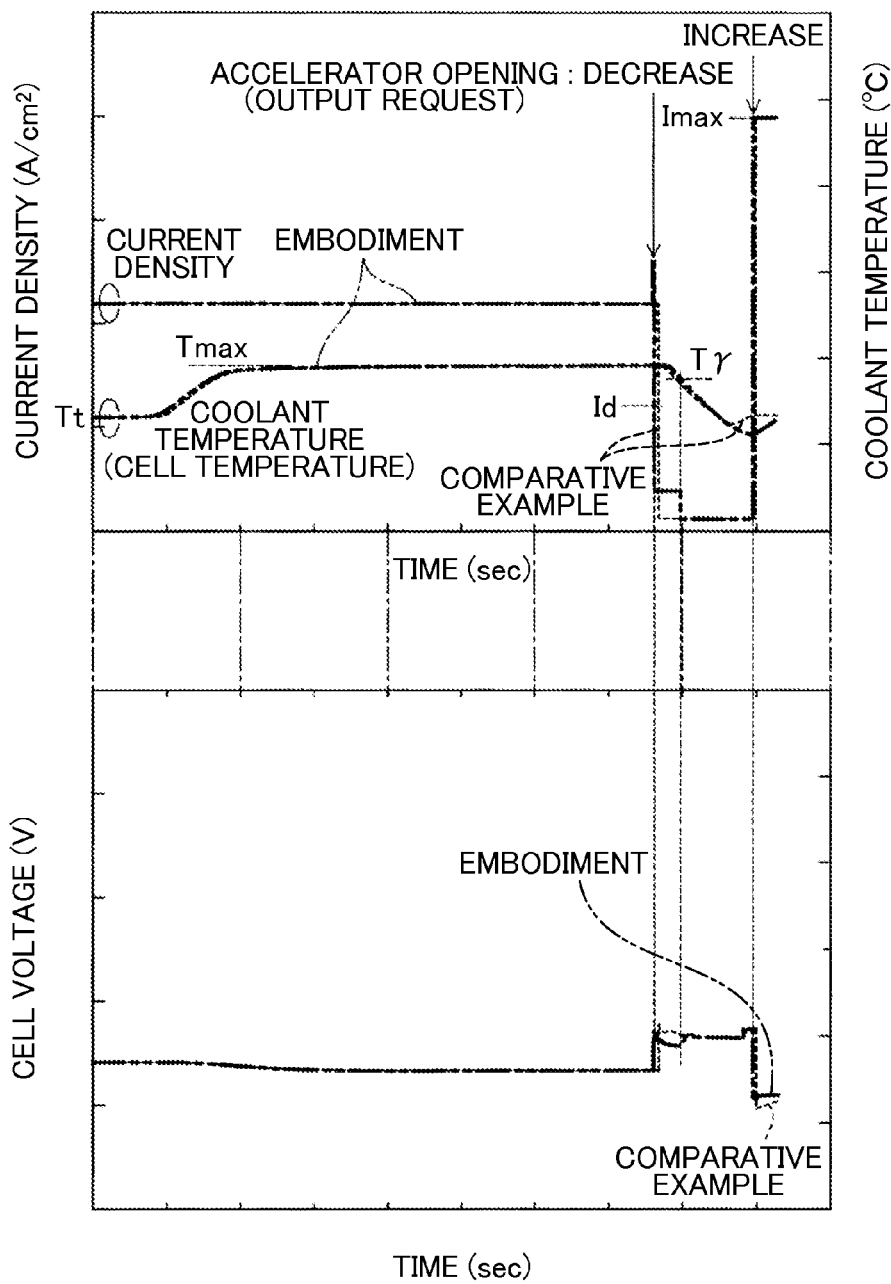
FIG. 5 is an explanatory view illustrating an example of the output control of the fuel cell to be performed according to the state of the temperature of the coolant as illustrated in FIG. 4.

FIG. 4 is an explanatory view illustrating a procedure of an output control of a fuel cell according to a state of the temperature of the coolant, which output control is performed in the second embodiment. FIG. 5 is an explanatory view illustrating an example of the output control of the fuel cell to be performed according to the state of the temperature of the coolant as illustrated in FIG. 4. Note that this control operation is performed by a controller 20 (see FIG. 1) at the same time as control of the basic operation.

First, in step S210, a temperature Tc of the coolant is acquired in the same manner as step S110 in FIG. 2. Then, it is determined whether the temperature of the coolant is a transient decrease state in step S220.

Here, after the temperature of the coolant deviates from a steady control state to enter a transient increase state as described in the first embodiment, the temperature reaches an operation maximum temperature Tmax in a balanced state. The operation is performed in the balanced state. Subsequently, when an accelerator opening, that is, an output request is decreased to such an extent that heat generation of cells 11 of the fuel cell 10 can be absorbed by cooling with the coolant, the temperature of the coolant enters a transient decrease state toward a steady temperature Tt. In view of this, a current density of an output current from the fuel cell 10 is used as a parameter corresponding to an output request, for example, and when the current density decreases over a current density Id [A/cm$^2$] as a decrease threshold output set in advance (that is, the current density decreases to be smaller than the decrease threshold output), it is determined that the temperature is in the transient decrease state. The current density Id as the decrease threshold output is also determined experimentally as a current density based on which the transient decrease can be determined. In the present embodiment, the current density Id is set to (0.3·Imax) relative to a current density Imax of a maximum output current.

When the temperature is not in the transient decrease state, the control of the output of the fuel cell is set to a normal control state according to the output request in step S240a. More specifically, an operation control is performed in a control setting corresponding to such an IV characteristic in which an output target value that is set in association with an output request in a normal operation is obtained. Hereinafter, the output target value is also referred to as the "normal output target value." The output target value may be a target value of a current density corresponding to the output request (see (A) shown in FIG. 5). Hereinafter, the target value of a current density is referred to as the "normal current density target value."

In a case of the transient decrease state, it is determined whether an acquired temperature Tc of the coolant has decreased to a decrease end threshold temperature Tγ [° C.] set in advance, in step S230. The decrease end threshold temperature Tγ is a temperature that satisfies Tt<Tγ<Tmax, and a temperature determined experimentally as a temperature that yields the after-mentioned effects.

In a case where the temperature Tc of the coolant has not decreased to the decrease end threshold temperature Tγ [° C.], that is, in a case of Tγ<Tc<Tmax, the output control of the fuel cell is set to an increase control state in step S240b. More specifically, the operation control is performed in a control setting corresponding to an IV characteristic in which the output target value is set to a value higher than the normal output target value. In the above IV characteristic, a current density value higher than the normal current density target value may be set as the output target value (see (A) SHOWN IN FIG. 5). In contrast, in a case where the temperature Tc of the coolant has decreased to the decrease end threshold temperature Tγ [° C.] or less, that is, in a case of Tc≤Tγ, the output control of the fuel cell is set to the normal control state according to the output request in step S240a. Note that the value higher than the normal output target value to which the output target value is set, e.g., the current density value that is higher than the normal current density target value, is a value experimentally determined as a value that achieves the after-mentioned effects.

Then, until it is determined that the operation of the fuel cell system is finished in step S250, the process from step S210 to step S240a or step S210 to step S240b is performed repeatedly.

When the above process is performed, the output target value is set to a value higher than the normal output target value in a period (a second period) after it is determined that the temperature Tc of the coolant is in the transient decrease state but before the temperature reaches the decrease end threshold temperature Tγ. Note that a comparative example illustrated in (A) of FIG. 5 indicates a case where the output target value is set to the normal output target value in the period after it is determined that the temperature Tc of the coolant is in the transient decrease state but before the temperature reaches the decrease end threshold temperature Tγ.

In a case where the output target value is set to the value higher than the normal output target value to increase an output of the fuel cell, an amount of water generated in the cathode of each cell 11 of the fuel cell 10 due to an electrochemical reaction can be increased, such that drying of the each cell 11 can be restrained. As a result, even in a case where the fuel cell is shifted to a high-temperature operation state after the transient decrease, a cell voltage in each cell 11 can be improved by an easy and simple technique so as to exhibit a high voltage characteristic as compared with the comparative example. Accordingly, it is possible to reduce a possibility that an available output of the fuel cell is limited depending on an operation state after the transient operation and the fuel cell cannot perform an output according to an output request. Note that FIG. 5 exemplifies a case the fuel cell is shifted to a maximum-output operation state with a maximum current density Imax.

Note that the current density Id, the decrease end threshold temperature Tγ, the decrease threshold temperature, and the like as decrease threshold outputs are values that are set to achieve the effect of restraining drying of each cell 11 by increasing water to be generated in the cathode of the each cell 11 of the fuel cell 10.

As apparent from the above description, the output control process of the fuel cell according to the state of the temperature of the coolant, which output control process is performed in the present embodiment, may be considered as a transient decrease control process of performing an output increase process of the present invention.

C. Third Embodiment

Figure 6:
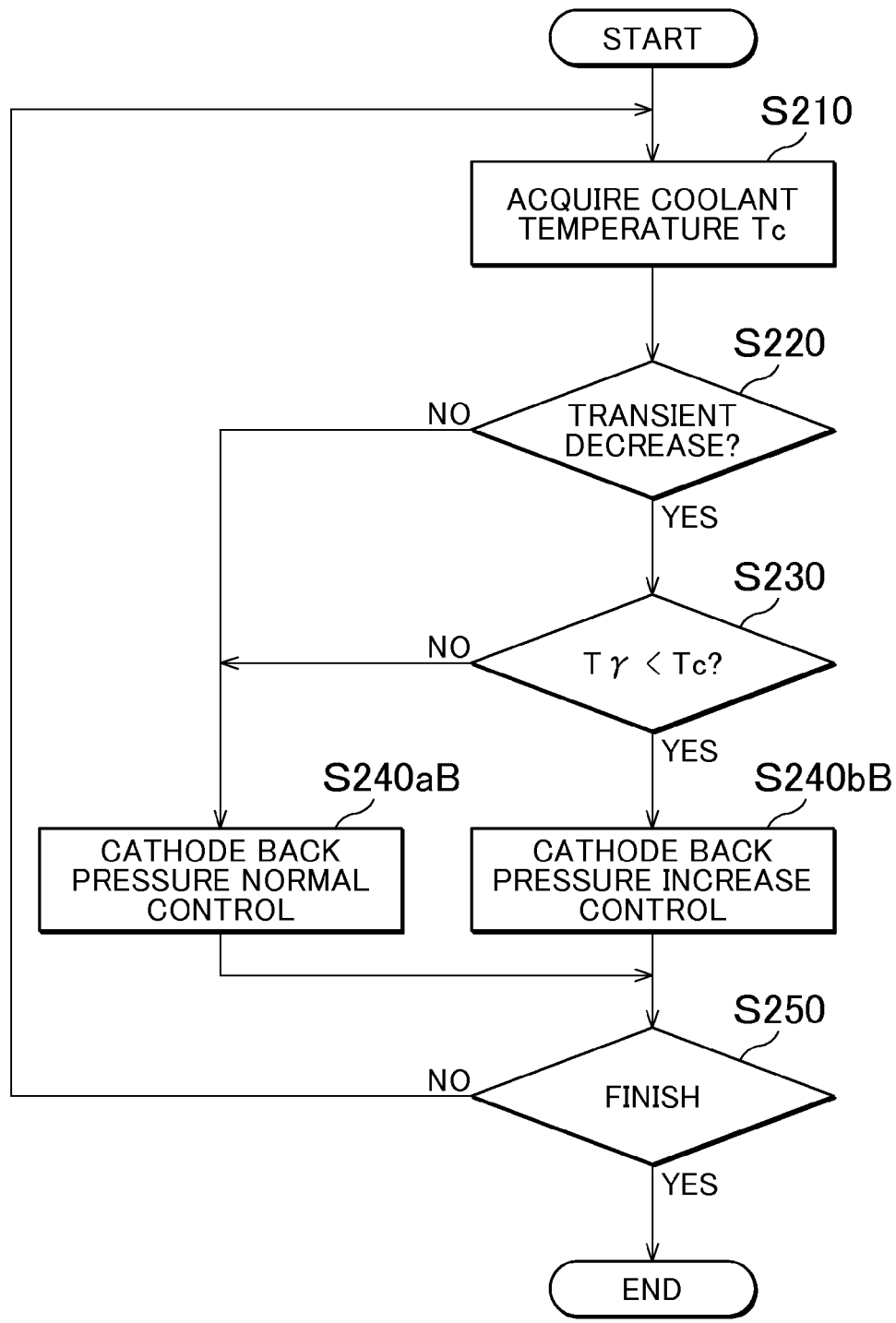
FIG. 6 is an explanatory view illustrating a procedure of a pressure control of a cathode gas according to a state of a temperature of a coolant, which pressure control is performed in a third embodiment of the present invention.

FIG. 6 is an explanatory view illustrating a procedure of a pressure control of a cathode gas according to a state of a temperature of a coolant, which pressure control is performed in the third embodiment. As apparent from the comparison between FIG. 6 and each of FIG. 2 of the first embodiment and FIG. 4 of the second embodiment, the output normal control of step S240a and the output increase control of step S240b in FIG. 4 are replaced with step S240aB of a cathode back pressure normal control, which is the same as step S140a in FIG. 3, and step S240bB of a cathode back pressure increase control, which is the same as step S140b in FIG. 3. Note that a configuration of a fuel cell system according to the present embodiment is the same as the fuel cell system 100 (see FIG. 1) of the first embodiment except a control operation of a controller.

In the second embodiment, a control to increase an output of the fuel cell is performed in the transient decrease period of the temperature of the coolant, as described above. However, the present embodiment has a feature that an operation target value of a pressure of a cathode gas is increased in a transient decrease period of a temperature of a coolant, similarly to the case of the transient increase period of the first embodiment. As described in the first embodiment, in a case where the pressure of the cathode gas is increased by setting the cathode back pressure to the value higher than the normal cathode back pressure value, the volume flow of the cathode gas passing through each cell 11 of the fuel cell 10 is reduced. Hereby, it is possible to restrain water from being carried away from the cathode of each cell 11 of the fuel cell 10, such that drying of the each cell 11 can be restrained. As a result, similarly to the second embodiment, even in a case where the fuel cell is shifted to a high-temperature operation state after the transient decrease, a cell voltage in each cell 11 can be improved by an easy and simple technique. Accordingly, it is possible to reduce a possibility that an available output of the fuel cell is limited depending on an operation state after the transient operation and the fuel cell cannot perform an output according to an output request.

Note that, in the process according to the second embodiment, it is necessary to absorb, by a secondary batter, for example, a surplus power generated by setting the output target value to be higher than the normal output target value according to the output request. Therefore, the process according to the second embodiment may not be able to be performed depending on a remaining capacity of the secondary battery. In contrast, in the present embodiment, no surplus power is generated, so it is not necessary to consider the remaining capacity of the secondary battery.

As apparent from the above description, the pressure control process of the cathode gas according to the state of the temperature of the coolant, which pressure control process is performed in the present embodiment, may be considered as a transient decrease control process of performing the oxidant gas pressure increase process in the present invention.

D. Fourth Embodiment

Figure 7:
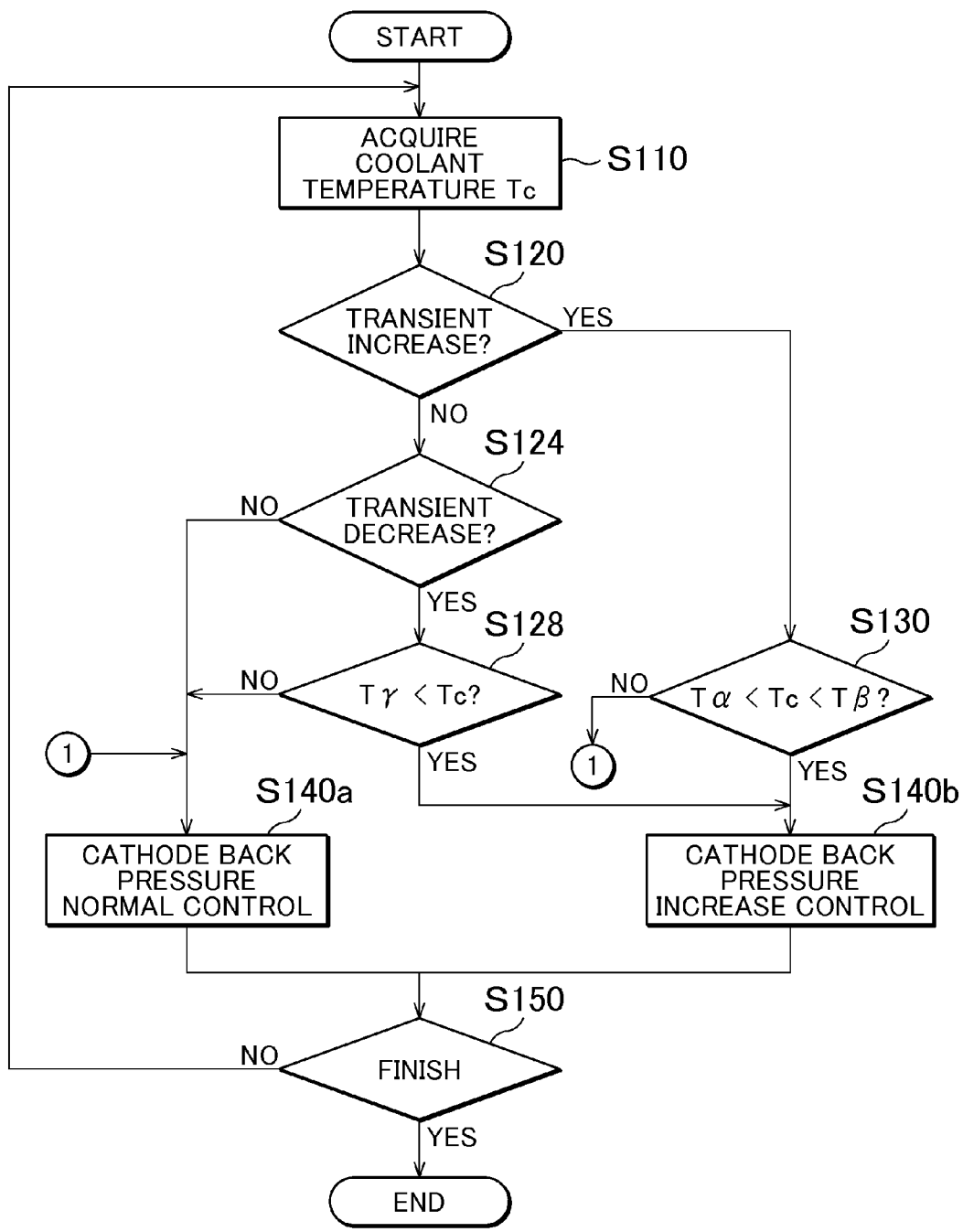
FIG. 7 is an explanatory view illustrating a procedure of a pressure control of a cathode gas according to a state of a temperature of a coolant, which pressure control is performed in a fourth embodiment of the present invention.

FIG. 7 is an explanatory view illustrating a procedure of a pressure control of a cathode gas according to a state of a temperature of a coolant, which pressure control is performed in the fourth embodiment. The control procedure of the present embodiment is a combination of the increase control of the cathode back pressure in the transient increase of the first embodiment with the increase control of the cathode back pressure in the transient decrease of the third embodiment. More specifically, as apparent from the comparison between FIG. 7 and each of FIG. 2 of the first embodiment and FIG. 6 of the third embodiment, step S124 of transient decrease determination, which is the same as step S220 in FIG. 6, and step S128 of determination on whether the temperature is decreased to a decrease end threshold Tγ, which is the same as step S230 in FIG. 6, are added between step S120 and step S140a in FIG. 2. Note that a configuration of a fuel cell system according to the present embodiment is the same as the fuel cell system 100 (see FIG. 1) of the first embodiment except a control operation by a controller.

In a case where it is determined that a temperature Tc of a coolant is in a transient decrease state in step S124 and it is determined that the temperature Tc of the coolant has not decreased to a decrease end threshold temperature Tγ in step S128, a cathode back pressure is set to an increase control state in step S140b.

In the present embodiment, an operation target value of a pressure of a cathode gas is increased in a transient increase period (a first period) of the temperature of the coolant, similarly to the first embodiment, and the operation target value of the pressure of the cathode gas is increased in a transient decrease period (a second period) of the temperature of the coolant, similarly to the third embodiment. Hereby, in the transient increase period and the transient decrease period, it is possible to restrain water from being carried away from a cathode of each cell 11 of a fuel cell 10, such that drying of the each cell 11 of the fuel cell 10 can be restrained. As a result, similarly to the first embodiment and the third embodiment, even in a case where the fuel cell is shifted to a high-temperature operation state after the transient increase state and to a high-temperature operation state after the transient decrease state, a cell voltage in each cell 11 of the fuel cell 10 can be improved by an easy and simple technique. Accordingly, it is possible to reduce a possibility that an available output of the fuel cell is limited depending on an operation state after the transient operation and the fuel cell cannot perform an output according to an output request.

E. Modification

In the first embodiment, the determination on whether the temperature of the coolant is in the transient increase state is performed based on whether the temperature increases over the increase threshold temperature Tα [° C.], but the determination may be performed in the following manner.

Since heat generation of each cell 11 of the fuel cell 10 is increased according to an increase in the accelerator opening, that is, an increase in the output request, when the output request to the fuel cell 10 is increased over the increase threshold output (when the output request is increase to be larger than the increase threshold output), it may be determined that the temperature is in the transient increase state. For example, by use of a current density of an output current from the fuel cell 10 as a parameter corresponding to an output request, it is also possible to determine whether the temperature is in the transient increase state, based on whether the current density becomes larger than a current density corresponding to an increase threshold output (80% of a maximum output, for example) set in advance. In terms of the current density as the increase threshold output, a current density based on which the transient increase can be determined is determined experimentally.

In the second embodiment and the third embodiment, the determination on whether the temperature of the coolant is in the transient decrease state is performed based on whether the current density decreases over the current density Id as the decrease threshold output. However, that temperature of the coolant based on which it is possible to determine that the temperature is in the transient decrease state may be set as the decrease threshold temperature, and when the temperature of the coolant decreases over the decrease threshold temperature (to be lower than the decrease threshold temperature), it may be determined that the temperature is in the transient decrease state. That temperature of the coolant based on which it can be determined that the temperature is in the transient decrease state is also determined experimentally as the decrease threshold temperature.

The fourth embodiment is a combination of the first embodiment with the third embodiment. However, the first embodiment may be combined with the second embodiment, such that the pressure of the cathode gas may be increased in the transient increase period (the first period) of the temperature of the coolant, similarly to the first embodiment, and the output of the fuel cell may be increased in the transient decrease period (the second period) of the temperature of the coolant, similarly to the second embodiment. Further, in the transient decrease period, the increase in the output of the fuel cell of the second embodiment and the increase of the pressure of the cathode gas in the third embodiment may be both performed.

In the above embodiments, the transient state is determined based on a change of the temperature of the coolant at an operating point of the fuel cell. However, it is also possible to determine the transient state based on a change of the flow rate of the cathode gas (oxidant gas) or a change of the flow rate of the anode gas (fuel gas) at the operating point of the fuel cell.

In the above embodiments, the fuel cell system is provided in a vehicle. However, the fuel cell system may not be provided in the vehicle, but may be provided in a movable body (e.g., a train or a vessel) other than the vehicle. Further, the fuel cell system of the above embodiments may be fixedly provided in facilities or buildings other than the movable body.

The present invention is not limited to the above embodiments, examples, and modifications, and is achievable in various configurations within a range that does not deviate from the gist of the present invention. The technical features that have not been described as essential in the present specification can be deleted appropriately.

What is claimed is:

1. A fuel cell system comprising:
    a fuel cell configured to generate a power by an electrochemical reaction between a fuel gas and an oxidant gas;
    a fuel gas supply/exhaust portion configured to supply the fuel gas to the fuel cell and to exhaust the fuel gas from the fuel cell;
    an oxidant gas supply/exhaust portion configured to supply the oxidant gas to the fuel cell and to exhaust the oxidant gas from the fuel cell;
    a cooling portion configured to circulate a coolant through the fuel cell; and
    a controller programmed to control the cooling portion to adjust a temperature of the coolant, wherein:
    the controller is programmed to perform at least one of a transient increase control process and a transient decrease control process;
    the controller is programmed to determine, in the transient increase control process, whether the temperature of the coolant is in a transient increase state in which a state of the temperature of the coolant is changed to a high-temperature state that deviates from a steady control state in which the temperature of the coolant is controlled to a steady temperature;
    the controller is programmed to perform, when the controller determines that the temperature of the coolant is in the transient increase state, an oxidant gas pressure increase process;
    the controller is programmed to control, in the oxidant gas pressure increase process, the oxidant gas supply/exhaust portion in a first period such that a target value of a pressure of the oxidant gas to be supplied to the fuel cell becomes higher than an operation target value corresponding to an operating state of the fuel cell system in the steady control state, the first period being a period during which the temperature of the coolant increases;
    the controller is programmed to determine, in the transient decrease control process, whether the temperature of the coolant is in a transient decrease state in which the state of the temperature of the coolant is changed to the steady control state from the high-temperature state deviating from the steady control state;
    the controller is programmed to perform, when the controller determines that the temperature of the coolant is in the transient decrease state, at least one of the oxidant gas pressure increase process and an output increase process in a second period, the second period being a period during which the state of the temperature of the coolant returns to a steady temperature state from the high-temperature state, the steady temperature state being a state of the temperature of the coolant in which the coolant is in the steady temperature; and
    the controller is programmed to control, in the output increase process, the fuel cell to generate an output higher than a target output corresponding to a request output.

2. The fuel cell system according to claim 1, wherein the controller is programmed to perform both the transient increase control process and the transient decrease control process.

3. The fuel cell system according to claim 1, wherein the controller is programmed to perform both the oxidant gas pressure increase process and the output increase process in the transient decrease control process.

4. The fuel cell system according to claim 1, wherein the controller is programmed to determine the transient increase state of the temperature of the coolant based on either one of a first condition and a second condition;
    the first condition is that the temperature of the coolant increases over an increase threshold temperature;
    the second condition is that an output request to the fuel cell is an increase threshold output or more;
    the controller is programmed to determine the transient decrease state of the temperature of the coolant based on either one of a third condition and a fourth condition;
    the third condition is that the temperature of the coolant decreases over a decrease threshold temperature; and
    the fourth condition is that the output request to the fuel cell is a decrease threshold output or less.

5. The fuel cell system according to claim 1, wherein:
    the first period is a period from a time point when the controller determines that the temperature of the coolant is in the transient increase state, until a time point when the temperature of the coolant increases to an increase end threshold temperature; and
    the second period is a period from a time point when it is determined that the temperature of the coolant is in the transient decrease state, until a time point when the temperature of the coolant decreases to a decrease end threshold temperature.

6. A control method of a fuel cell system, the control method being for controlling supply of a fuel gas, an oxidant gas, and a coolant to a fuel cell to generate a power, the control method comprising:
  performing at least one of a transient increase control process and a transient decrease control process, wherein:
  in the transient increase control process, it is determined whether a temperature of the coolant is in a transient increase state in which a state of the temperature of the coolant is changed to a high-temperature state deviating from a steady control state in which the temperature of the coolant is controlled to a steady temperature;
  when it is determined that the temperature of the coolant is in the transient increase state, an oxidant gas pressure increase process is performed in a first period during which the temperature of the coolant increases, the oxidant gas pressure increase process being a process of setting a target value of a pressure of the oxidant gas to be supplied to the fuel cell to a value that is higher than an operation target value corresponding to an operating state of the fuel cell system in the steady control state;
  in the transient decrease control process, it is determined whether the temperature of the coolant is in a transient decrease state in which the state of the temperature of coolant is changed to the steady control state from the high-temperature state deviating from the steady control state;
  when it is determined that the temperature of the coolant is in the transient decrease state, at least one of the oxidant gas pressure increasing process and an output increase process is performed in a second period, the second period being a period during which the state of the temperature of the coolant returns to a steady temperature state from the high-temperature state, the steady temperature state being a state of the temperature of the coolant in which the coolant is in the steady temperature; and
  in the output increase process, a target value of an output of the fuel cell is set to a value higher than a target value corresponding to a request output.

* * * * *